United States Patent [19]

Sutton et al.

[11] 4,114,130
[45] Sep. 12, 1978

[54] FUEL LEVEL SENDER WITH MOLDED PLASTIC CASE

[75] Inventors: Stephen J. Sutton, Fenton; J. Robert Holen, Flushing; John E. Creager, Fenton, all of Mich.

[73] Assignee: General Motors Corporation, Detroit, Mich.

[21] Appl. No.: 854,711

[22] Filed: Nov. 25, 1977

[51] Int. Cl.² .......................................... H01L 10/14
[52] U.S. Cl. ...................................... 338/33; 73/317; 338/164; 338/184
[58] Field of Search ................. 338/33, 160, 162, 164, 338/184, 199; 340/244 R; 73/308, 317

[56] References Cited

U.S. PATENT DOCUMENTS

| 1,902,933 | 3/1933 | Zubaty | 338/164 X |
| 2,266,298 | 12/1941 | Bacon | 338/184 X |
| 2,713,264 | 7/1955 | Howell | 73/317 |
| 3,482,200 | 12/1969 | Hamilton | 338/33 |

*Primary Examiner*—C. L. Albritton
*Attorney, Agent, or Firm*—Warren D. Hill

[57] ABSTRACT

A float operated fuel level sender for an automotive vehicle fuel tank includes a molded plastic case secured to a conductive plate. A potentiometer assembly (electrically connected to a fuel gauge) includes a resistor secured within the plastic case and a wiper element movable with the float arm along the length of the resistor. The wiper element is electrically and mechanically connected to the float arm which in turn is connected through a contact element to the conductive plate to provide an electrical ground return. The plastic case has an integral resilient finger formed therein which is biased against the end of the float arm to urge the contact member against the conductive plate thereby assuring a good ground connection.

1 Claim, 4 Drawing Figures

FUEL LEVEL SENDER WITH MOLDED PLASTIC CASE

This invention relates to a float operated fuel level sender and particularly to such a sender having a molded plastic case with an integral resilient element.

Fuel level senders for automotive vehicles conventionally include a housing carrying a potentiometer resistor connected to an electrical gauge unit which supplies current to the resistor. A potentiometer wiper element is connected to a float operated arm which is pivoted to the sender housing such that the wiper element moves along the resistor as the fuel level varies. The end of the float arm is journalled in the housing. A washer type contact element carried by the float arm engages the grounded conductive plate to assure that the wiper element is grounded. To assure the integrity of the electrical contact between the washer and the conductive plate, a coil spring acting between the wall of the case and the float arm urges the float arm in a direction to hold the contact element against the conductive plate. It is desirable to simplify the structure of the sending unit and decrease the number of parts used and to improve the accuracy and consistency of the sender unit.

It is, therefore, a general object of the invention to provide a case for a fuel level sender wherein the functions of some separate parts are consolidated into a single unit to improve ease of fabrication and assembly as well as to improve the integrity of the completed unit.

The invention is carried out by providing a fuel level sender assembly having a molded plastic case secured to a conductive plate, the case includes a resilient integral finger which supplies a spring force against a float arm of the sender assembly to assure sound electrical contact between the float arm and the conductive plate. The invention further contemplates a sleeve on the resilient finger for journalling the float arm.

The above and other advantages will be made more apparent from the following specification taken in conjunction with the accompanying drawings wherein like reference numerals referred to like parts and wherein.

Figure 1:
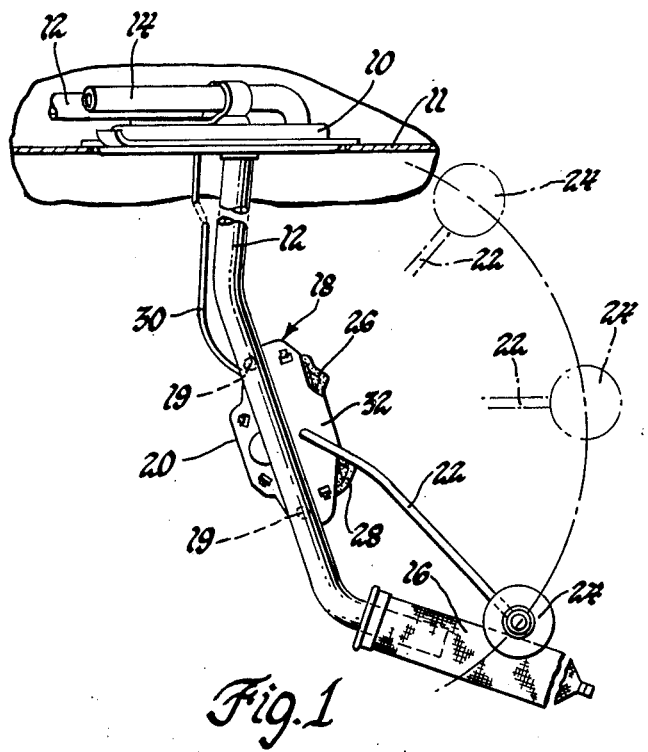
FIG. 1 is a view of a fuel tank suction tube and fuel level sender assembly which incorporates the fuel level sender according to this invention.

As shown in FIG. 1, a fuel level sender assembly includes a cover plate 10 adapted to be secured to an aperture in an upper surface 11 of a fuel tank. A conventional fuel line 12 and vapor emissions tube 14 are connected to the top of the cover 10. The fuel line 12 (or suction tube) extends down through the cover to its lower terminal point where a filter 16 is secured to the fuel line. At some point along the fuel line above the fuel filter a fuel level sender unit 18 is secured at its upper and lower extremities to the fuel line 12 by projection welds 19. The fuel level sender includes a housing 20, a float arm 22 pivoted to the housing at one end, and a float 24 mounted on the other end of the float arm so that the float arm swings about its pivot point according to the fuel level. The extreme positions of the float arm 22 are limited by upper and lower stops 26 and 28 respectively formed on the housing 20. A conductive strip 30 extends between an electrical terminal on the fuel sender 18 to a terminal post (not shown) on the cover 10. Electrical current from the vehicle fuel gauge is supplied through the vehicle harness to the conductive strip 30 to electrically energize the fuel level sender.

Figure 3:
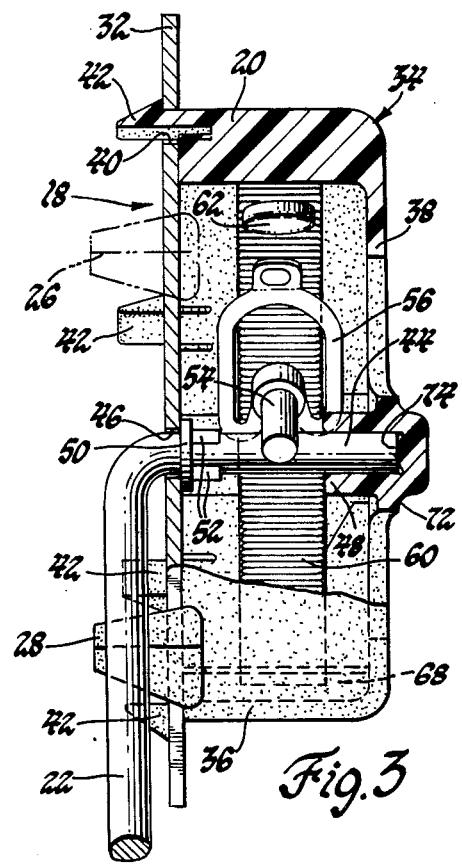
FIG. 3 is a view of the fuel level sender taken along lines 3—3 of FIG. 2.
Figure 2:
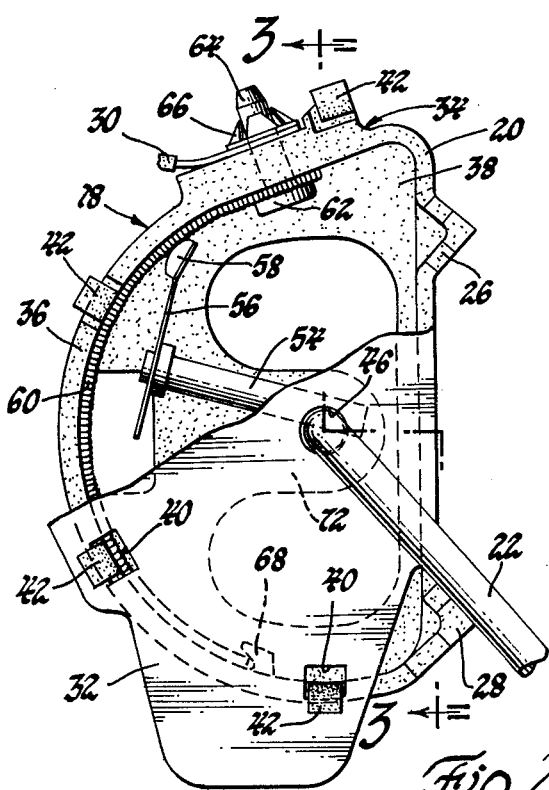
FIG. 2 is a partly broken away view of the fuel level sender of FIG. 1.

As shown in FIGS. 2 and 3, the housing 20 of the fuel level sender 18 comprises a conductive sheet metal plate 32 attached to one end of a molded plastic acetal casing 34 which comprises a side wall 36 and an end wall 38 opposite the conductive plate 32. The plate 32 contains four rectangular apertures 40 near its periphery and the case 34 carries four corresponding flexible hooks 42 which extend through the apertures 40 and engage the outer side of the plate 32 to secure the plate 32 to the case 34.

Figure 4:
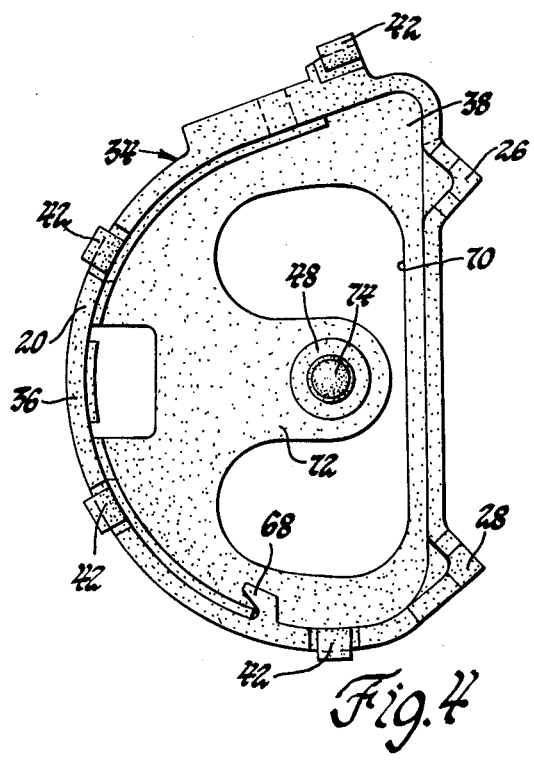
FIG. 4 is a detailed elevational view of the case of the sender unit according to the invention.

The float arm 22 is bent at a right angle to define a pivot portion 44 which extends through an aperture 46 in the conductive plate 32. The end of the pivot portion 44 is journaled in a sleeve 48 molded in the case 34. A metal washer or contact element 50 surrounding the pivot portion 44 lies adjacent the conductive plate 32 and is trapped against the plate by a pair of projections 52 swagged from the pivot portion 44. A metal rod 54 is welded to the pivot portion 44 to extend at right angles thereto and supports on its free end a flexible metal element 56 which in turn carries a contact 58. The assembly 54, 56, 58 comprises a wiper element of a potentiometer. The resistor of the potentiometer is a wire wound resistor 60 secured to the inner wall 36 of the case 34. The upper end of the resistor 60 is held in place by a headed fastener 62 extending through the wall 36 and terminating in a connecting post 64 outside the wall 36 where the conductive strip 30 is secured by a push nut 66. As best shown in FIG. 4, the case carries on its inner wall an inwardly turned hook 68 which serves to hold the lower end of the resistor 60 thereby securing the resistor in the case where the resistor conforms to the wall 36. The contact 58 of the wiper element slidably engages the resistor 60 throughout the range of travel of the contact 58. To facilitate uniform contact pressure, the wall 36 and consequently the resistor 60 are formed in an arc concentric with the pivot portion 44 of the float arm. The potentiometer voltage at the terminal 64 is dependent upon the float level and, therefore, the position of the contact 58 on the resistor 60. The portion of the resistor 60 engaging the contact 58 is grounded through the wiper element 54, 56, 58, the pivot portion 44, and the contact element 50 which is in electrical contact with the grounded conductive plate 32.

Referring to FIG. 4, the end wall 38 of the case 34 contains a double lobed opening 70 which defines a resilient finger portion 72 of the end wall 38. The finger 72 carries the aforementioned sleeve 48. The end of the cavity defined by the sleeve 48 is a convex surface 74 which serves as a thrust bearing surface engaging the end of pivot portion 44. The pivot portion 44 is long enough that the end of the finger 72 is pushed away from its relaxed as-molded position so that it develops a spring force acting against the pivot portion 44 which transfers the force through the projections 52 to the washer or contact element 50 and to the conductive plate 32 thereby establishing a firm electrical connection between the contact element 50 and the conductive plate 32.

The stops 26 and 28 which limit the pivotal motion of the float arm 22 are integrally molded on the case 34 and project beyond the plane of the conductive plate 32 to extend into the plane of travel of the flat arm 22. Since the resistor 60 and the stops 26 and 28 are fixed in their position by the design of the molded case 38, the travel range of the contact 58 along the resistor 60 will be consistent from part to part since the position of those features is fixed by the mold design and are not altered through assembly tolerances.

It will thus be seen that the fuel level sender according to this invention provides a necessary biasing function to assure electrical contact between the contact element 50 and the conductive plate 32 without requiring a separate spring; rather a spring element i.e. resilient finger 72 is integrally molded as a part of the plastic case 34 and serves as a sleeve bearing, a thrust bearing, and a bias member, each function being of high reliability and not subject to significant variation from one part to another.

The embodiments of the invention in which an exclusive property or privilege is claimed are defined as follows:

1. A fuel level sender having a float arm pivoted to a housing, the housing comprising a conductive plate and a molded plastic case secured to the conductive plate, a potentiometer within the housing including a wiper element connected to the float arm for movement therewith, a contact member on the float arm adjacent the conductive plate electrically connected with the wiper element, the case including an integrally molded resilient finger having a free end biased toward the conductive plate, a sleeve member integrally formed on the free end of said resilient finger, the said float arm being journalled in the sleeve member so that the contact member on the float arm is urged by the resilient finger into secure electrical contact with the conductive plate thereby electrically connecting the wiper element of the potentiometer with the conductive plate.

* * * * *